INVENTOR.
Robert E. Rath

July 23, 1963  R. E. RATH  3,098,992
POSITION SENSING AND CONTROL MEANS
Filed Dec. 30, 1960  3 Sheets-Sheet 2

INVENTOR.
Robert E. Rath
BY Charles B. Gordon
Attorney

July 23, 1963 R. E. RATH 3,098,992
POSITION SENSING AND CONTROL MEANS
Filed Dec. 30, 1960 3 Sheets-Sheet 3 variations of error sign register output and gate output with time, assuming reception of either f2a or f2b, but not both INVENTOR.
Robert E. Rath
BY Charles B. Gordon
Attorney United States Patent Office 3,098,992
Patented July 23, 1963

3,098,992
POSITION SENSING AND CONTROL MEANS
Robert E. Rath, Morristown, N.J., assignor to The Peelle Company, Brooklyn, N.Y., a corporation of New York
Filed Dec. 30, 1960, Ser. No. 79,712
6 Claims. (Cl. 340—1)

This invention relates to a control system particularly appropriate for controlling the position of a movable element such as an elevator car with reference to a fixed position or positions such as a floor level or levels.

The invention provides accurate level control while eliminating the lengthy cables and like interconnections required in conventional control systems.

The invention contemplates a pulse echo system wherein outgoing ultrasonic wave trains originating at a control station are echoed from a pair of subsidiary stations such as a floor station and an elevator car in such a way that the respective echoes returning from each of the pair of subsidiary stations may be discriminated from each other, other than on a basis of direction or time of reception. Because the echoes have this feature of discriminatability they are in the aggregate rich in information and this information is extracted and translated into the useful form of control signals by appropriate techniques of signal discrimination (e.g. frequency tuning) and logic circuitry.

Thus there may be provided information in the form of a control signal, indicating the sign as well as the magnitude of the time interval between the arrival of different returned or echoed wave trains associated with the same outgoing wave train.

The echoes or reflections as referred to above are not in all cases true echoes or reflections in the strictest sense.

Figure 1:
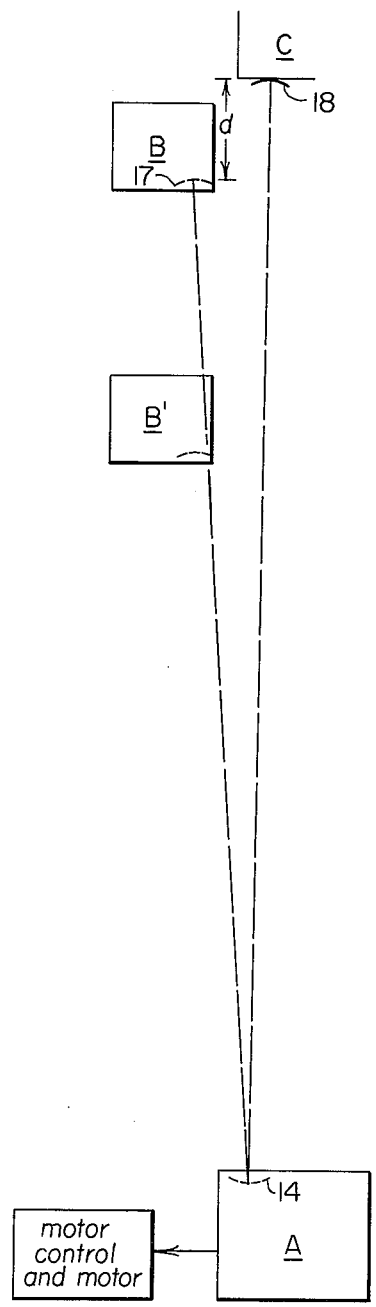
FIGURE 1 is a schematic illustration of a system embodying the invention.
Figure 2:
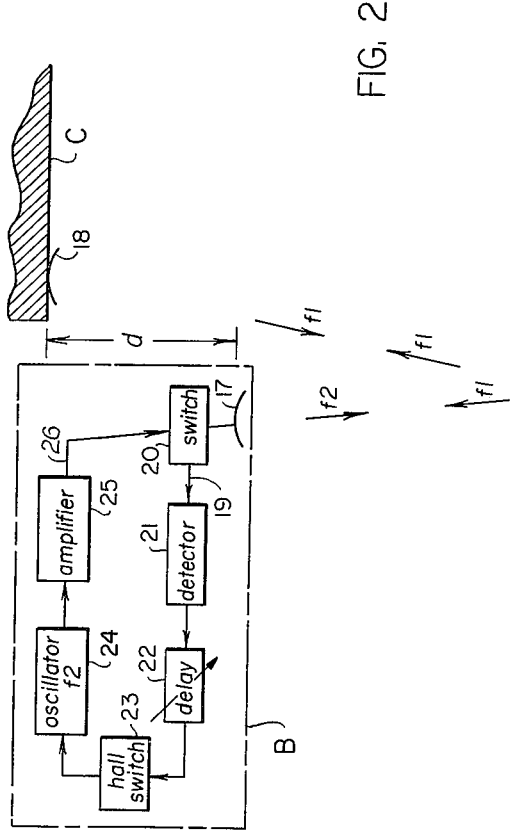
FIGURE 2 is a block diagram of apparatus for carrying out the invention.
Figure 2:
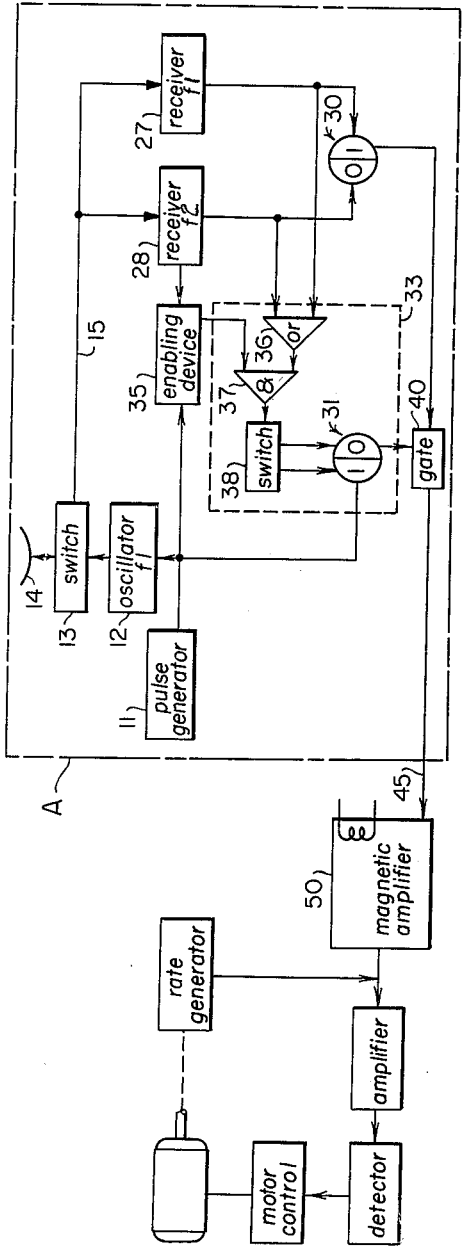

Shown in FIGURE 1 is a primary station A and a subsidiary station B such as a floor station in an elevator system, past which an elevator cab C moves vertically in both directions. Additional floor stations, such as the floor station B', will be present in elevator applications. The elements of the primary station A and the subsidiary station B are shown in FIGURE 2. The other subsidiary substations such as B' will be understood to be like station B.

The primary station A which may be located at the bottom of the elevator shaft is provided with a sending-receiving transducer 14 adapted to transmit outgoing ultrasonic wave trains and to receive reflected ultrasonic wave trains. The floor station B (and other floor stations such as B') are equipped with receiving-sending (or "reflecting") transducers such as the transducer 17 in floor station B. In the particular embodiment described, the elevator C is provided with a reflector 18 adapted to reflect ultrasonic wave trains broadcast from the transducer 14 of the primary station A. Thus the pulses or echoes returned from the reflector 18 are of the same frequency as those originally transmitted from the transducer 14. However the ultrasonic wave trains received by the transducer 17 at the floor station B are "returned" only after a time delay and at a different frequency.

In FIGURES 1 and 2, car C is illustrated in its rest position, level at floor station B. The transducer 17 is positioned distance $d$ closer to the primary basement station A than the reflector 18 on the car C when the car is leveled at subsidiary floor station B. The time delay effected in "returning" wave trains received by the transducer 17 is equal to the time required for wave trains directed from the primary station A to the elevator cab reflector 18 to travel the distance $d$ between the transducer 17 and the reflector 18 and return. Accordingly, the wave trains returned from the floor station B and the wave trains returned from the car C will arrive together at the transducer 14 of the primary station A, arriving at the same instant when the car C is level at the floor B, i.e., is at "no-error" position at the floor B.

In the apparatus shown in FIGURE 2, a pulse generator 11 at the floor station A generates pulses of say 10 microseconds duration at a pulse rate which will allow for sufficient resolution time, say five cycles per second for an application involving a 100-foot elevator shaft. The pulses are of sufficient voltage amplitude to trigger oscillator 12 so that it generates a burst of sinusoidal energy at an appropriate high frequency $f1$ of say from 15 to 100 kc. Pulse generator 11 also pulses the set "1" lead of the error magnitude register 31 to assure that the gate 40 is closed as each pulse cycle commences.

A send-receive switch 13 is adapted to transmit electronic wave trains received from the oscillator 12 to the send-receive transducer 14 to the exclusion of the lead 15. The switch 13 is also adapted to transmit electronic wave trains received from the transducer 14 to the lead 15 to the exclusion of the lead from the oscillator 12.

The transducer 14 converts the electronic wave trains received from the oscillator 12 via the switch 13 to the ultrasonic wave trains of frequency $f1$ which are transmitted to the floor station B and the car C.

If desired, the transducer 14 may be replaced by a pair of transducers consisting of a sending transducer directly fed by the oscillator 12 and a receiving transducer connected to the lead 15. In this case the switch 13 would be eliminated and only the sending transducer would be connected to the oscillator and only the receiving transducer would be connected to the lead 15.

In the particular apparatus illustrated, the floor station B is equipped with a transducer 17 and the car C is equipped with a reflector 18 which returns a true echo of outgoing ultrasonic wave trains originating at the transducer 14. Thus, the pulses or echoes returned from the reflector 18 are of $f1$ frequency.

The transducer 17 converts received ultrasonic wave train energy to electronic wave train energy of frequency $f1$ which is transmitted through a receive-send switch 20 and a lead 19 to a detector 21. The switch 20 is adapted to transmit bursts of sinusoidal energy received from the transducer 17 to the detector 21 to the exclusion of the lead 26 returning from the amplifier 25. The switch 20 is also adapted to transmit bursts of sinusoidal energy received from the amplifier 25 to the transducer 17 to the exclusion of the lead 19.

If desired, the switch 20 may be eliminated and the transducer 17 may be replaced by a pair of transducers consisting of a receiving transducer connected to the lead 19 but not to the lead 26 and a sending transducer connected to the lead 26 but not to the lead 19.

The electronic wave trains received at the detector 21 cause the detector to generate an output signal which through the adjustable delay device 22 and a hall switch 23 is led to an oscillator 24 which is responsive to input of the signal to generate an output frequency at $f2$. Frequency $f2$ is somewhat higher or lower than frequency $f1$. The $f2$ output of the oscillator 24 is then suitably amplified by the amplifier 25 and is transmitted by the switch 20 to the transducer 17 whereupon it is converted to pulses or bursts of ultrasonic energy having a frequency $f2$.

In FIGURE 2 as in FIGURE 1, the car C is illustrated in its rest position, level at the floor station B so that in the illustrated condition the transducer 17 is positioned distance $d$ closer to the primary basement station A than the reflector 18 on the car C. The time delay of the device 22 is equal to the time required for $f1$ wave trains directed to the reflector 18 to travel the distance $d$ between the transducer 17 and the reflector 18 and return. Accordingly, the $f2$ energy from the floor station B and the $f1$ energy echoed from the car C will return together to the transducer 14 at the primary station A, arriving at the same instant when the car C is level at the floor B, i.e., when the car C is at "no-error" position at the floor B. The delay interval of the delay device 22 is adjustable for the purpose of adjusting the "no-error" level of the car C.

The remaining circuitry at the primary or basement station A interprets the information contained in the ultrasonic wave trains "echoed" from the subsidiary stations B and C by determining the relative time of arrival of the $f2$ energy from the floor station B and the $f1$ energy from the car C and provides a control scheme for the car motor to move the car in the direction which tends to make the two "echoes" arrive at the same time, indicating that the car is at "no-error" position at the floor station B.

A new pulse of $f1$ energy will be received by a receiver 27 for each outgoing $f1$ energy pulse transmitted by the transducer 14 because of an echo from the reflector 18. If no $f2$ energy pulse is received, it is an indication that the circuit at floor station B is open because the hall switch 23 has not been closed. Accordingly no movement is called for and the car will not move.

Once the hall switch is closed, $f2$ energy will be detected by the receiver 28 and the time interval between reception of the $f1$ signal at the receiver 27 and reception of the $f2$ signal at the receiver 28 will measure the magnitude of error in position of the car C. Whether the car C is too low or too high with relation to the floor station B is indicated by whether the $f1$ echo is received at the primary station A respectively earlier or later than the $f2$ "echo."

When the $f1$ receiver 27 senses an $f1$ signal or pulse, it transmits an output signal the duration of which is the same as the duration of the sensed $f1$ signal or pulse. The commencement of this output signal sets error sign register 30 to "1" which corresponds to a "too low, go up" registration.

When the $f2$ receiver 28 senses an $f2$ pulse, it transmits an output signal the duration of which is the same as the duration of the sensed $f2$ pulse. The commencement of this output signal sets error sign register 30 to "0" which corresponds to a "too high, go down registration.

Arrival at an enabling device 35 of the first three or four pulses of an uninterrupted succession of output pulses from the $f2$ receiver 28 conditions the enabling device 35 so that upon arrival thereat of the next pulse from the pulse generator 11, the enabling device 35 establishes an output signal constituting a steady transmission signal to error magnitude circuitry 33. Such steady transmission continues throughout the duration of such uninterrupted succession of $f2$ pulses and for an interval following termination of such uninterrupted succession. The latter interval may be equal in extent to three or four pulse periods.

Figure 4:
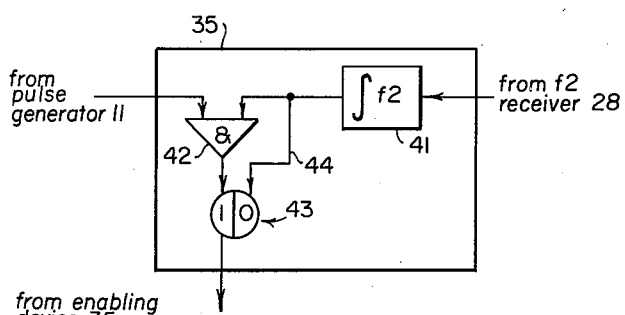
FIGURE 4 is a diagrammatic detail of one of the elements shown in FIGURES 2 and 5.

A suitable enabling device 35 would comprise that illustrated in FIGURE 4. An integrator 41 includes a condenser (not shown) which charges with a quantum of energy for each $f2$ pulse transmitted from the receiver 28. After three or four pulses are transmitted to the integrator 41, a steady output appears which opens an "&" gate 42 for the next signal from the pulse generator 11. When such signal arrives from the pulse generator 11, the register 43 is set to the state illustrated in FIGURE 4 to thereby provide an output signal from the enabling device 35 to open the gate 37 (or the "&" gates 84 and 85 to be later described) for admitting transmissions from the receivers 27 and 28 to the error magnitude circuit 33 (or the error magnitude circuit 83, to be later described, as the case may be).

A time constant controls the discharge of the condenser of the enabling device 35 so that three or four pulse periods after transmissions from the receiver 28 cease to arrive at the integrator 41 the output signal of the integrator decays to an amplitude which will neither keep open the "&" gate 42 nor tolerate the state of the register 43 which is illustrated in FIGURE 4. The state of the register 43 is thereby reversed from the state illustrated and the gate 37 (or gates 84, 85) become non-conducting.

As shown in the drawing, the output signals of the $f1$ and $f2$ receivers 27 and 28 are led to an "or" gate 36 which itself supplies an output signal during such time as an input signal is being received from either or both of the receivers 27 and 28. The output signals from the enabling device 35 and from the "or" gate 36 are led to an "&" gate 37 which provides an output signal only during such times as input signals are being received from both the enabling device 35 and the "or" gate 36.

The output of the "&" gate 37 is led to a switch 38 which is adapted to reverse the registration of the error magnitude register 31 on each occasion of the beginning of reception of a signal from the "&" gate 37.

If the hall switch 23 is not closed, and if no other hall switches are closed, the circuit at the subsidiary floor station B will be inoperative and no $f2$ signals will be received by the primary basement station A. Accordingly, the enabling device 35 will remain dormant, and there will be no output signals from the "&" gate 37. The pulse generator 11 will transmit set "1" signals to the error magnitude register 31.

When the hall switch 23 is closed, the $f2$ receiver 28 will receive a series of $f2$ signals and will commence to supply an uninterrupted succession of corresponding output signals activating the enabling device 35 which then, as of the beginning of a pulse cycle, enables the "&" gate 37 to transmit signals received from the "or" gate 36.

Under these conditions, whichever of the two signals arrives first, $f2$ from the $f2$ receiver 28 or $f1$ from the $f1$ receiver 27, reverses the state of the register 31, thus setting register 31 to "0" which corresponds to gate-conducts registration thereby establishing the gate 40 in conducting condition, and at the same time setting the error sign register to "0" (if $f2$) or to "1" (if $f1$). The resulting signal from the error sign register 30 is then passed through the gate 40 to provide an output control signal in the output lead 45 of the primary station A. This may be a D.C. signal, the polarity of which depends on the setting, "0" or "1," of the error sign register 30.

This output signal is generated by the error sign register 30, the error magnitude circuitry 33, and the gate 40, acting in concert.

The next pulse to be received, either $f1$ or $f2$, again reverses the state of register 31 and sets the register to "1" which corresponds to gate-does-not-conduct registration so that gate 40 is established in non-conducting condition and the signal from the error sign register 30 no longer is applied at the output of the device A. Thus the error magnitude indicated by the duration of the control signal at the output of the device A is determined by the duration of the interval between reversals of the state of the register 31.

Figure 3:
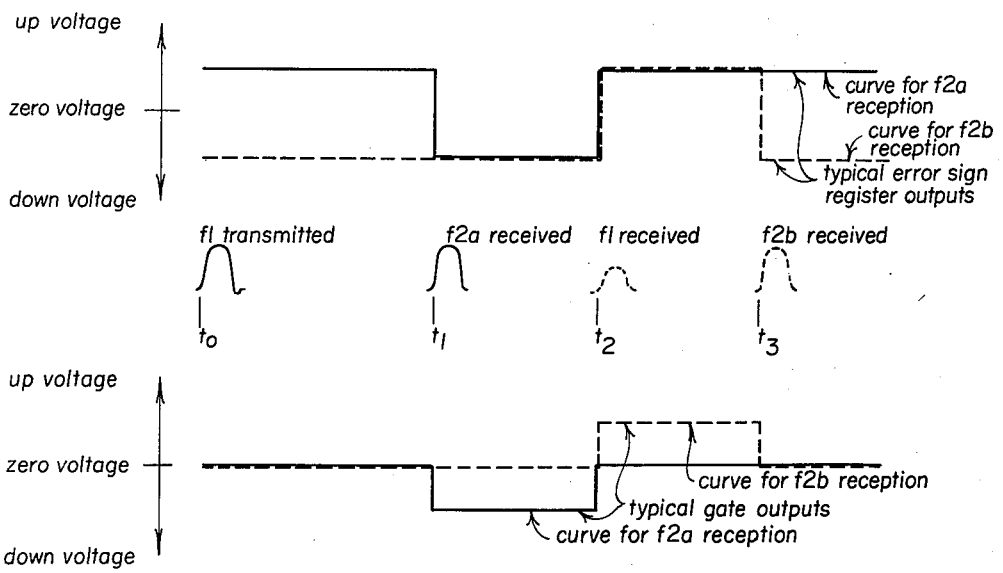
FIGURE 3 is a somewhat idealized graphic illustration of (1) examples of output signals of the error sign register portion of the apparatus and (2) corresponding examples of output signals generated by the over-all apparatus at the primary station A of FIGURE 2.

The top portion of FIGURE 3 illustrates in a somewhat idealized manner the complementary nature of the signals generated by the error sign register 30 according to the sequence of reception of the output of the $f1$ and $f2$ receivers 27 and 28. The solid curve illustrates the variation of error sign register with time if a "reflected" $f2$ pulse (labeled $f2a$ in the figure) is received at time $t_1$ before reception of the associated $f1$ pulse occurs at time $t_2$. The dash curve illustrates the variation of error sign register with time if a "reflected" $f2$ pulse (labeled $f2b$ in the figure) is received at time $t_3$ after reception of the associated $f1$ pulse.

The bottom portion of FIGURE 3 illustrates in a somewhat idealized manner the polarized nature of the output signals at the output lead 45 of the primary station A. The solid curve illustrates the control signal output associated with the early-arriving "reflected" pulse labeled $f2a$. The dash curve illustrates the control signal output associated with the late-arriving pulse labeled $f2b$.

The translation of this output control signal is accomplished by conventional methods using magnetic amplifiers and rate generator inverse feedback as indicated schematically in FIGURE 2. Such conventional methods are known and are discussed in the following, the disclosures of which are adapted for present purposes as if expressly repeated herein.

W. R. Ahrendt and C. J. Savant, Jr., Servo Mechanism Practice, pp. 138–139 (McGraw-Hill, 2nd. ed., 1960).

W. A. Geyger, Magnetic Amplifier Circuits, p. 316 (McGraw-Hill, 1957).

From the above, it will be apparent that the polarity of the output control signal passed to the first magnetic amplifier by the gate depends upon the sequence of $f1$ and $f2$ pulses in each cycle of operation of the apparatus. If the $f2$ pulse arrives first, the polarity of the output control signal which is also the magnetic amplifier input signal (actually the state of the error sign register 30 when the gate 40 conducts) is such that the car C will be driven down because the direction in which the elevator motor drives is directly dependent on the polarity of the input signal to the first magnetic amplifier. If the $f1$ pulse arrives first, the polarity of the signal passed from the gate 40 to the first magnetic amplifier will be reversed, and the motor will drive in the opposite direction. The direction of motor drive is such as to "move" the $f1$ pulse in time toward the $f2$ pulse. As the condition approaches when the $f1$ and $f2$ pulses are received at the same time, the resulting pulse will approach zero duration and, thus, zero signal to the first magnetic amplifier will allow the motor to stop. The car C will be at the level of the station B.

It may be desirable to avoid the possibility of problems that may be encountered when the interval between the $f1$ and $f2$ pulses diminishes to a time which is so short as to exceed the resolution capabilities of the elements 27–38 and particularly the elements 36–38 in that the $f1$ and $f2$ signals are so close together as to be indistinguishable.

Figure 5:
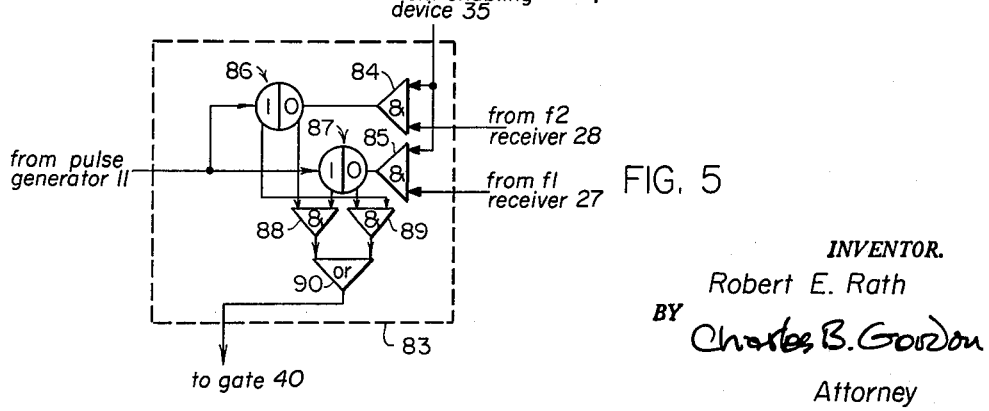
FIGURE 5 is a diagram showing a form of the error magnitude register which replaces the error magnitude register shown in FIGURE 2.

Thus the error magnitude circuit 33 shown in FIGURE 2 may be replaced by the error magnitude circuit 83 as shown in FIGURE 5.

In the circuit 83 there are provided the "&" gates 84, 85, 88 and 89 and an "or" gate 90. There are also provided the registers 86 and 87.

The output signal of the enabling device 35 puts the "&" gates 84 and 85 in condition to pass pulses transmitted from the receivers 27 and 28.

The operation of the circuit is as follows:

Pulse generator 11 sets both of the registers 86 and 87 to the states shown in FIGURE 5.

Next, after the enabling device is activated by reception of three or four successive pulses from $f2$ receiver 28, the two "&" gates 84 and 85 receive the output transmission of the enabling device 35 to thereby be put in condition to pass pulses transmitted from the receivers 27 and 28.

Whichever of the two signals, $f1$ from the $f1$ receiver 27 or $f2$ from the $f2$ receiver 28, arrives first at the error magnitude circuit 83 will reverse the state of its associated register 86 or 87. One of the registers 86 or 87 will then be in the illustrated state and the other register will be in the complementary state. The circuitry will be seen to be such that thereupon one or the other of the "&" gates 88 and 89 transmits to establish through the "or" gate 90 an output signal for the error magnitude circuit 83 which establishes the gate 40 in conducting condition. Only when the states of the registers 86 and 87 are "unlike" is the circuitry transmissive to the "or" gate 90 and the gate 40.

The next pulse to be received, be it $f1$ or $f2$ then reverses its associated register 86 or 87 to the state which is complementary to that illustrated in FIGURE 4 whereby both the registers 86 and 87 are in states complementary to those shown in FIGURE 5 so that neither of the "&" gates 88 and 89 transmits and the output signal from the error magnitude circuit 83 thereby terminates to establish the gate 40 in non-conducting condition.

On the succeeding cycle, the pulse generator reverses the state of both the registers 86 and 87 to again re-establish the states illustrated in FIGURE 5 so that the registers become re-set for either sequential or simultaneous actuation by successive or simultaneous receptions, as the case may be, of the next-occurring $f1$ and $f2$ pulses.

Openings and closings of the gate 40 thus become fully independent of time-discriminations between the outputs of receivers 27 and 28.

The above describes the means for leveling the car at a floor where service has been requested as by closing of the hall switch 23. It is also required that the car can be directed to a floor by actuation of control means from the car. This may be accomplished for example by remote radio actuation of the hall switches at the respective floor stations such as stations B and B'. Thus there may be provided radio controlled solenoids (not shown) for closing the hall switches, such as the switch 23. Each floor is provided with a radio controlled solenoid selectively responsive to actuation of its own one of a number of control buttons (not shown) in the cab C. That is, each button in the cab C actuates its own radio signalling device (not shown) which signals selectively its own one of the hall switch control devices located at the several floor stations, such as the stations B and B'.

The above description of the invention should make it apparent that many details of the apparatus embodying the invention may be varied without departing from the teaching of the invention. Accordingly, the scope of the invention is not to be limited to precise details of the specifically described embodiments but is to be defined by the following claims.

What is claimed is:

1. A control system for providing at a primary station a control signal corresponding in magnitude to the amount of displacement and in sign to the direction of displacement of a controlled moving object with respect to a subsidiary reference station remote to said primary station, said control system comprising means for periodically transmitting an outgoing ultrasonic wave train toward said subsidiary reference station and said object, signal return means at said subsidiary reference station and at said object and responsive to reception of each said transmitted ultrasonic wave train for transmitting a returning ultrasonic wave train toward said primary station, at least one of said signal return means including means for giving a distance-independent signal characteristic to each said wave train returned therefrom to render said each said wave train discriminatable by said characteristic, and not merely by direction or time of reception, from a wave train returned from the other of said signal return means, and logic means at said primary station for utilizing said discriminatability to indicate in the form of a control signal the sign as well as the magnitude of the time interval between the arrival of different returning ultrasonic wave trains resulting from the same outgoing ultrasonic wave train.

2. A control system for providing at a primary station a control signal corresponding in magnitude to the amount of displacement and in sign to the direction of displacement of a controlled moving object with respect to a subsidiary reference station remote to said primary station, said control system comprising means for periodically transmitting an outgoing ultrasonic wave train toward said subsidiary reference station and said object, signal return means at said subsidiary reference station and at said object and responsive to reception of each said transmitted ultrasonic wave train for transmitting a returning ultrasonic wave train toward said primary station, at least one of said signal return means including means for giving a distance-independent signal characteristic to each said wave train returned therefrom to render said each said wave train discriminatable by said characteristic, and not merely by direction or time of reception, from a wave train returned from the other of said signal return means, at least one of said signal return means including time delay means for providing a predetermined adjustable time interval between reception of each said outgoing ultrasonic wave train at said at least one signal return means and responsive transmittal of a returning ultrasonic wave train from said at least one signal return means, and logic means at said primary station including means for utilizing said discriminatability to indicate in the form of a control signal the sign as well as the magnitude of the time interval between the arrival of different returning ultrasonic wave trains resulting from the same outgoing ultrasonic wave train.

3. A control system for providing at a primary station a control signal corresponding in magnitude to the amount of displacement and in sign to the direction of displacement of a controlled moving object with respect to a subsidiary reference station remote to said primary station, said control system comprising means for periodically transmitting an outgoing ultrasonic wave train toward said subsidiary reference station and said object, signal return means at said subsidiary reference station and at said object and responsive to reception of each said transmitted ultrasonic wave train for transmitting a returning ultrasonic wave train toward said primary station, at least one of said signal return means including means for returning an ultrasonic wave train of a different frequency than that received, and logic means at said primary station for identifying, according to frequency, the origin of each said returning ultrasonic wave train and indicating in the form of a control signal the sign as well as the magnitude of the time interval between the arrival of different returning ultrasonic wave trains resulting from the same outgoing ultrasonic wave train.

4. A control system for providing at a primary station a control signal corresponding in magnitude to the amount of displacement and in sign to the direction of displacement of a controlled moving object with respect to a subsidiary reference station remote to said primary station, said control system comprising means for periodically transmitting an outgoing ultrasonic wave train toward said subsidiary reference station and said object, signal return means at said subsidiary reference station and at said object and responsive to reception of each said transmitted ultrasonic wave train for transmitting a returning ultrasonic wave train toward said primary station, at least one of said signal return means including means for returning an ultrasonic wave train of a different frequency than that received, at least one of said signal return means including time delay means for providing a predetermined adjustable time interval between reception of each said outgoing ultrasonic wave train at said at least one signal return means and responsive transmittal of a returning ultrasonic wave train from said at least one signal return means, and logic means at said primary station for identifying, according to frequency, the origin of each said returning ultrasonic wave train and indicating in the form of a control signal the sign as well as the magnitude of the time interval between the arrival of different returning ultrasonic wave trains resulting from the same outgoing ultrasonic wave train.

5. A control system for providing at a primary station a control signal corresponding in magnitude to the amount of displacement and in sign to the direction of displacement of a controlled moving object with respect to a subsidiary reference station remote to said primary station, said control system comprising means for periodically transmitting an outgoing ultrasonic wave train toward said subsidiary reference station and said object, a pair of signal return means one of which is at said subsidiary reference station and the other of which is at said object, each of said signal return means being responsive to reception of each said transmitted ultrasonic wave train for transmitting a returning ultrasonic wave train toward said primary station, at least one of said signal return means including means for giving a distance independent signal characteristic to each said wave train returned therefrom to render said each said wave train discriminatable by said characteristic, and not merely by direction or time of reception, from a wave train returned from the other of said signal return means, and logic means at said primary station for utilizing said discriminatability to indicate in the form of a control signal the sign as well as the magnitude of the time interval between the arrival of different returning ultrasonic wave trains resulting from the same outgoing ultrasonic wave train, said last named means comprising first and second discrimination means each selectively responsive to signals returned from its own one of said pair of signal return means, error sign register means for generating a polarized signal of a first polarity in response to actuation of said first discrimination means and a polarized signal of a second opposite polarity in response to actuation of said second discrimination means, error magnitude register means for allowing the transmission of said polarized signals only during the time interval between the respective actuations of said first and second discrimination means resulting from the broadcasting of the same outgoing ultrasonic wave train.

6. A control system for accurately positioning a movable object at a remote subsidiary reference station along the linear path of travel of the object by providing at a primary station a control signal proportional in magnitude to the amount of displacement and corresponding in polarity to the direction of displacement of said movable object with respect to said remote subsidiary reference station, said control system comprising means for periodically transmitting an outgoing ultrasonic wave train toward both said subsidiary reference station and said object, signal return means at said subsidiary reference station and at said object which respond to the reception of each said transmitted ultrasonic wave train by transmitting a returning ultrasonic wave train toward said primary station, at least one of said signal return means including means for returning an ultrasonic wave train of a frequency different than that received to render said returning wave train discriminatable, by frequency difference, from a wave train returned from the other of said signal return means, and logic means at said primary station for utilizing said discriminatability to derive said control signal by determining arrival sequence as well as time interval between arrivals of returning wave trains resulting from the same outgoing wave train.

References Cited in the file of this patent

UNITED STATES PATENTS

| | | |
|---|---|---|
| 2,134,716 | Gunn | Nov. 1, 1938 |
| 2,480,561 | Ewing et al. | Aug. 30, 1949 |
| 2,634,610 | Silverman | Apr. 14, 1953 |
| 2,765,565 | Mussio | Oct. 9, 1956 |
| 2,769,966 | Rines | Nov. 6, 1956 |
| 2,887,671 | Frankel et al. | May 19, 1959 |